US011729269B1

(12) United States Patent
Meernik et al.

(10) Patent No.: US 11,729,269 B1
(45) Date of Patent: Aug. 15, 2023

(54) BANDWIDTH MANAGEMENT IN DISTRIBUTED FILE SYSTEMS

(71) Applicant: Qumulo, Inc., Seattle, WA (US)

(72) Inventors: Landon John Meernik, Seattle, WA (US); Porter Michael Smith, Seattle, WA (US); Kevin David Jamieson, North Vancouver (CA); Daniel Shvarts, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/973,944

(22) Filed: Oct. 26, 2022

(51) Int. Cl.
*H04L 67/1097* (2022.01)
*G06F 9/50* (2006.01)
*G06F 9/48* (2006.01)
*H04L 67/06* (2022.01)
*G06F 16/182* (2019.01)
*H04L 47/50* (2022.01)
*H04L 67/62* (2022.01)

(52) U.S. Cl.
CPC ........ *H04L 67/1097* (2013.01); *G06F 9/4881* (2013.01); *G06F 9/505* (2013.01); *H04L 67/06* (2013.01); *G06F 9/5083* (2013.01); *G06F 16/182* (2019.01); *H04L 47/50* (2013.01); *H04L 67/62* (2022.05)

(58) Field of Classification Search
CPC .. G06F 9/4881; G06F 9/5083; G06F 16/2471; H04L 47/783; H04L 47/50; H04L 67/62; H04L 67/1097; H04L 67/60
See application file for complete search history.

(56) References Cited

U.S. PATENT DOCUMENTS 5,165,031 A 11/1992 Pruul et al.
5,283,875 A 2/1994 Gibson et al.
(Continued)

FOREIGN PATENT DOCUMENTS

EP 1217551 A2 6/2002
EP 1498829 A1 1/2005
(Continued)

OTHER PUBLICATIONS

Office Communication for U.S. Appl. No. 16/226,587 dated Aug. 5, 2019, pp. 1-46.
(Continued)

*Primary Examiner* — Tom Y Chang
(74) *Attorney, Agent, or Firm* — John W. Branch; Branch Partners PLLC

(57) ABSTRACT

Embodiments are directed to bandwidth management in distributed file systems. A request stored in a queue may be dequeued. A work credit value may be determined based on a duration since a last job and a work rate associated with the file system such that the work credit value conforms to a maximum threshold value. A job may be initialized based on the dequeued request such that the work credit value may be reduced based on a size of the job. In response to the reduced work credit value being a negative value further actions may be performed, including: determining a time delay based on the reduced work credit value, the work rate, and the size of the job; delaying an execution of the job until the expiry of the time delay such that upon expiry of the time delay, the job is executed to satisfy the request.

28 Claims, 10 Drawing Sheets

(56) References Cited

U.S. PATENT DOCUMENTS

| | | |
|---|---|---|
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Tyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,846,698 B1 | 12/2017 | Panidis et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,621,057 B2 | 4/2020 | Tripathi et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 11,150,823 B2 | 10/2021 | Gao et al. |
| 11,157,458 B1 | 10/2021 | Carter et al. |
| 11,265,262 B1 | 3/2022 | Makie et al. |
| 11,630,832 B2 * | 4/2023 | Choi ................ G06F 16/25 |
| | | 707/602 |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0061783 A1 * | 3/2007 | Prakash ................ G06F 9/505 |
| | | 717/145 |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |

(56) References Cited

U.S. PATENT DOCUMENTS

| | | |
|---|---|---|
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0110105 A1 | 4/2016 | Karamcheti et al. |
| 2016/0139836 A1 | 5/2016 | Nallathambi et al. |
| 2016/0139952 A1* | 5/2016 | Geng .................. G06F 9/4881 718/103 |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |

(56) References Cited

U.S. PATENT DOCUMENTS

| | | | |
|---|---|---|---|
| 2018/0089031 A1 | 3/2018 | Mitkar et al. | |
| 2018/0101546 A1 | 4/2018 | Krasnow et al. | |
| 2018/0129443 A1 | 5/2018 | Karve et al. | |
| 2018/0203798 A1 | 7/2018 | Hughes et al. | |
| 2018/0276078 A1 | 9/2018 | Blea et al. | |
| 2018/0288057 A1 | 10/2018 | Varadamma et al. | |
| 2018/0314423 A1 | 11/2018 | Gong et al. | |
| 2018/0357291 A1* | 12/2018 | Choi | G06F 16/25 |
| 2018/0365115 A1 | 12/2018 | Fang et al. | |
| 2019/0087770 A1 | 3/2019 | Walsh et al. | |
| 2019/0095112 A1 | 3/2019 | Lingarajappa | |
| 2019/0102700 A1 | 4/2019 | Babu et al. | |
| 2019/0163589 A1 | 5/2019 | McBride et al. | |
| 2019/0163591 A1 | 5/2019 | Ouyang et al. | |
| 2019/0196879 A1 | 6/2019 | Dutta et al. | |
| 2019/0212921 A1 | 7/2019 | Liang et al. | |
| 2019/0220189 A1 | 7/2019 | Yang et al. | |
| 2019/0286521 A1 | 9/2019 | Okpotse et al. | |
| 2019/0286528 A1 | 9/2019 | Wu et al. | |
| 2019/0384640 A1 | 12/2019 | Swamy et al. | |
| 2020/0004977 A1 | 1/2020 | Araujo et al. | |
| 2020/0026438 A1 | 1/2020 | Peleg et al. | |
| 2020/0034077 A1 | 1/2020 | Haravu et al. | |
| 2020/0050391 A1 | 2/2020 | Meyerowitz et al. | |
| 2020/0142878 A1 | 5/2020 | Varadarajan et al. | |
| 2020/0174692 A1 | 6/2020 | Dave et al. | |
| 2020/0242075 A1 | 7/2020 | Davis et al. | |
| 2020/0286270 A1 | 9/2020 | Lymperopoulos et al. | |
| 2020/0341689 A1 | 10/2020 | Smith | |
| 2020/0387315 A1 | 12/2020 | Sterns et al. | |
| 2020/0409583 A1 | 12/2020 | Kusters et al. | |
| 2021/0004355 A1 | 1/2021 | Iwase | |
| 2021/0042263 A1 | 2/2021 | Zdornov et al. | |
| 2021/0042282 A1 | 2/2021 | Cseri et al. | |
| 2021/0056074 A1 | 2/2021 | Zhu | |
| 2021/0110150 A1 | 4/2021 | Kakrana et al. | |
| 2021/0191650 A1 | 6/2021 | Vansteenkiste et al. | |
| 2021/0240393 A1 | 8/2021 | Jo et al. | |
| 2021/0240678 A1 | 8/2021 | Patel et al. | |
| 2021/0279187 A1 | 9/2021 | Puder et al. | |
| 2021/0311841 A1 | 10/2021 | McNutt | |
| 2021/0374105 A1 | 12/2021 | Kodama et al. | |
| 2022/0019361 A1 | 1/2022 | Kurata et al. | |
| 2022/0035831 A1 | 2/2022 | Beers | |
| 2022/0058055 A1* | 2/2022 | Amemiya | G06F 9/546 |
| 2022/0066882 A1 | 3/2022 | Wang et al. | |
| 2022/0091739 A1 | 3/2022 | Kumar et al. | |
| 2022/0107729 A1* | 4/2022 | Hua | G06F 11/1076 |
| 2022/0124152 A1* | 4/2022 | Gallego | G06F 3/067 |
| 2023/0057068 A1* | 2/2023 | Bhandarkar | H04L 47/6225 |
| 2023/0057600 A1* | 2/2023 | Malley | G06F 9/3848 |

FOREIGN PATENT DOCUMENTS

| | | | |
|---|---|---|---|
| WO | 1999044145 A1 | 9/1999 | |
| WO | 0072201 A1 | 11/2000 | |
| WO | 2009007250 A2 | 1/2009 | |
| WO | 2012029259 A1 | 3/2012 | |

OTHER PUBLICATIONS

Office Communication for U.S. Appl. No. 16/228,716 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.

(56) References Cited

OTHER PUBLICATIONS

Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 15/288,853 dated Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 28, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Examination Report for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-7.

(56) References Cited

OTHER PUBLICATIONS

Examination Report for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.

(56) References Cited

OTHER PUBLICATIONS

Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 17/484,167 dated Mar. 11, 2022, pp. 1-11.
Office Communication for U.S. Appl. No. 17/062,500 dated Mar. 22, 2022, pp. 1-19.
Office Communication for U.S. Appl. No. 17/504,289 dated Mar. 28, 2022, pp. 1-9.
Office Communication for U.S. Appl. No. 17/588,120 dated Apr. 11, 2022, pp. 1-36.
Office Communication for U.S. Appl. No. 17/588,895 dated Apr. 27, 2022, pp. 1-6.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.
Office Communication for U.S. Appl. No. 17/491,017 dated May 12, 2022, pp. 1-50.
Office Communication for U.S. Appl. No. 17/484,167 dated May 17, 2022, pp. 1-3.
Office Communication for U.S. Appl. No. 17/484,167 dated Jun. 10, 2022, pp. 1-5.
Office Communication for U.S. Appl. No. 17/203,452 dated Jun. 22, 2022, pp. 1-22.
Office Communication for U.S. Appl. No. 14/595,598 dated Jul. 13, 2022, pp. 1-9.
Office Communication for U.S. Appl. No. 17/062,500 dated Jul. 26, 2022, pp. 1-20.
Office Communication for U.S. Appl. No. 17/588,120 dated Jul. 27, 2022, pp. 1-34.
Office Communication for U.S. Appl. No. 17/190,653 dated Aug. 2, 2022, pp. 1-8.
Office Communication for U.S. Appl. No. 17/115,529 dated Aug. 8, 2022, pp. 1-21.
Office Communication for U.S. Appl. No. 17/588,895 dated Aug. 12, 2022, pp. 1-12.
Office Communication for U.S. Appl. No. 17/491,017 dated Aug. 17, 2022, pp. 1-5.
Office Communication for U.S. Appl. No. 17/203,452 dated Sep. 8, 2022, pp. 1-4.
Office Communication for U.S. Appl. No. 17/491,017 dated Sep. 15, 2022, pp. 1-55.
Office Communication for U.S. Appl. No. 17/864,190 dated Sep. 19, 2022, pp. 1-10.
Office Communication for U.S. Appl. No. 17/062,500 dated Oct. 5, 2022, pp. 1-4.
Office Communication for U.S. Appl. No. 17/203,452 dated Oct. 19, 2022, pp. 1-9.
Office Communication for U.S. Appl. No. 17/588,120 dated Oct. 21, 2022, pp. 1-5.
Office Communication for U.S. Appl. No. 17/203,452 dated Nov. 9, 2022, pp. 1-2.
Office Communication for U.S. Appl. No. 17/588,895 dated Nov. 9, 2022, pp. 1-11.
Office Communication for U.S. Appl. No. 17/954,640 dated Nov. 30, 2022, pp. 1-10.
Office Communication for U.S. Appl. No. 17/115,529 dated Dec. 9, 2022, pp. 1-21.
Office Communication for U.S. Appl. No. 17/864,190 dated Jan. 24, 2023, pp. 1-12.
Office Communication for U.S. Appl. No. 17/588,120 dated Feb. 1, 2023, pp. 1-15.
Office Communication for U.S. Appl. No. 17/491,017 dated Feb. 10, 2023, pp. 1-57.
Office Communication for U.S. Appl. No. 18/070,705 dated Feb. 23, 2023, pp. 1-14.
Office Communication for U.S. Appl. No. 17/062,500 dated Feb. 27, 2023, pp. 1-23.

\* cited by examiner

BANDWIDTH MANAGEMENT IN DISTRIBUTED FILE SYSTEMS

TECHNICAL FIELD

The present invention relates generally to file systems, and more particularly, but not exclusively, to bandwidth management in distributed file systems.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth. In some cases, some of these file system administrative actions may be critical for maintaining data integrity or otherwise mitigating against data loss. Accordingly, in some embodiments, system bandwidth that may be allocated to user activity may interfere with critical administrative functions. Also, in some cases, naively blocking or restricting user activities may be disadvantageous for user experience or user satisfaction. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
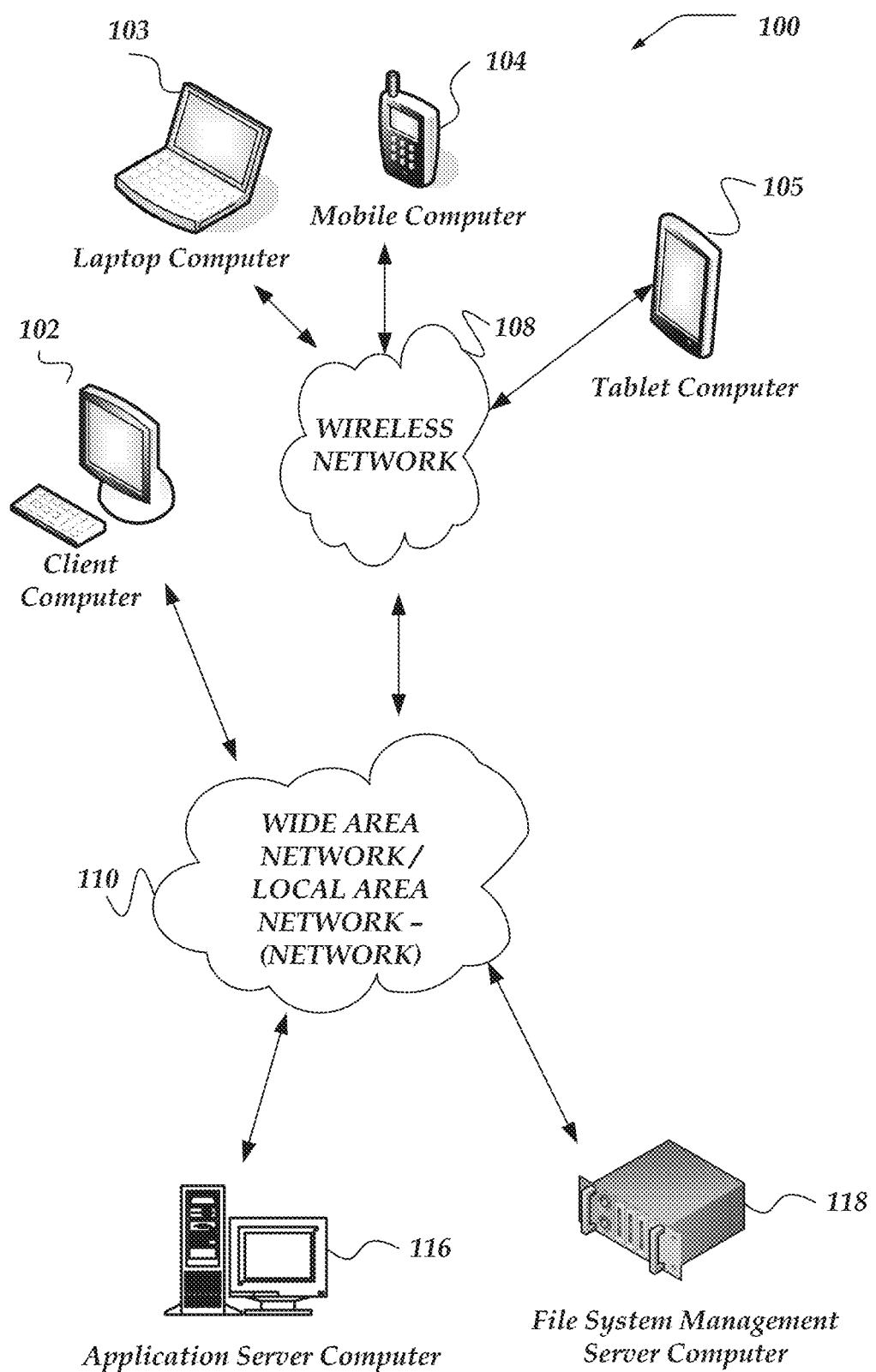
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to bandwidth management in distributed file systems. In one or more of the various embodiments, a request stored in a queue may be dequeued based on availability of computational resources.

In one or more of the various embodiments, a duration may be determined based on a first timestamp that corresponds to the dequeuing of the request and a second timestamp that corresponds to a prior dequeuing of a previous request.

In one or more of the various embodiments, a work credit value may be determined based on the duration and a work rate associated with the file system such that the work credit value conforms to a maximum threshold value.

In one or more of the various embodiments, a job may be initialized based on the dequeued request such that the work credit value may be reduced based on the size of the job.

In one or more of the various embodiments, in response to the reduced work credit value being a negative value further actions may be performed, including: determining a time delay based on the reduced work credit value, the work rate, and the size of the job; delaying an execution of the job until the expiry of the time delay such that upon expiry of the time delay, the job is executed to satisfy the request; or the like.

In one or more of the various embodiments, two or more adjacent requests in the queue may be determined such that each adjacent request corresponds to a same file system object and an adjacent data location in the file system object. In one or more of the various embodiments, a portion of the two or more adjacent requests that have a combined data size that is less than a threshold value may be determined. In some embodiments, the portion of the two or more adjacent requests may be coalesced into a single request in the queue.

In one or more of the various embodiments, in response to the dequeued request being directed to reading or writing metadata corresponding to one or more file system objects, the job may be executed immediately.

In one or more of the various embodiments, the second timestamp may be updated to match the first timestamp.

In one or more of the various embodiments, the request may be stored in the queue based on a type associated with the request. In some embodiments, the queue may be determined from a plurality of queues such that each queue corresponds to a data write request type, a data read request type, a metadata write request type, or a metadata read request type.

In one or more of the various embodiments, another request may be dequeued from the queue or one or more other queues. In one or more of the various embodiments, another work credit value may be determined based on another duration, another work rate associated with the file system, and the other work credit value.

In one or more of the various embodiments, the queue may be determined based on a type of the request. In one or more of the various embodiments, the request may be stored in the determined queue.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
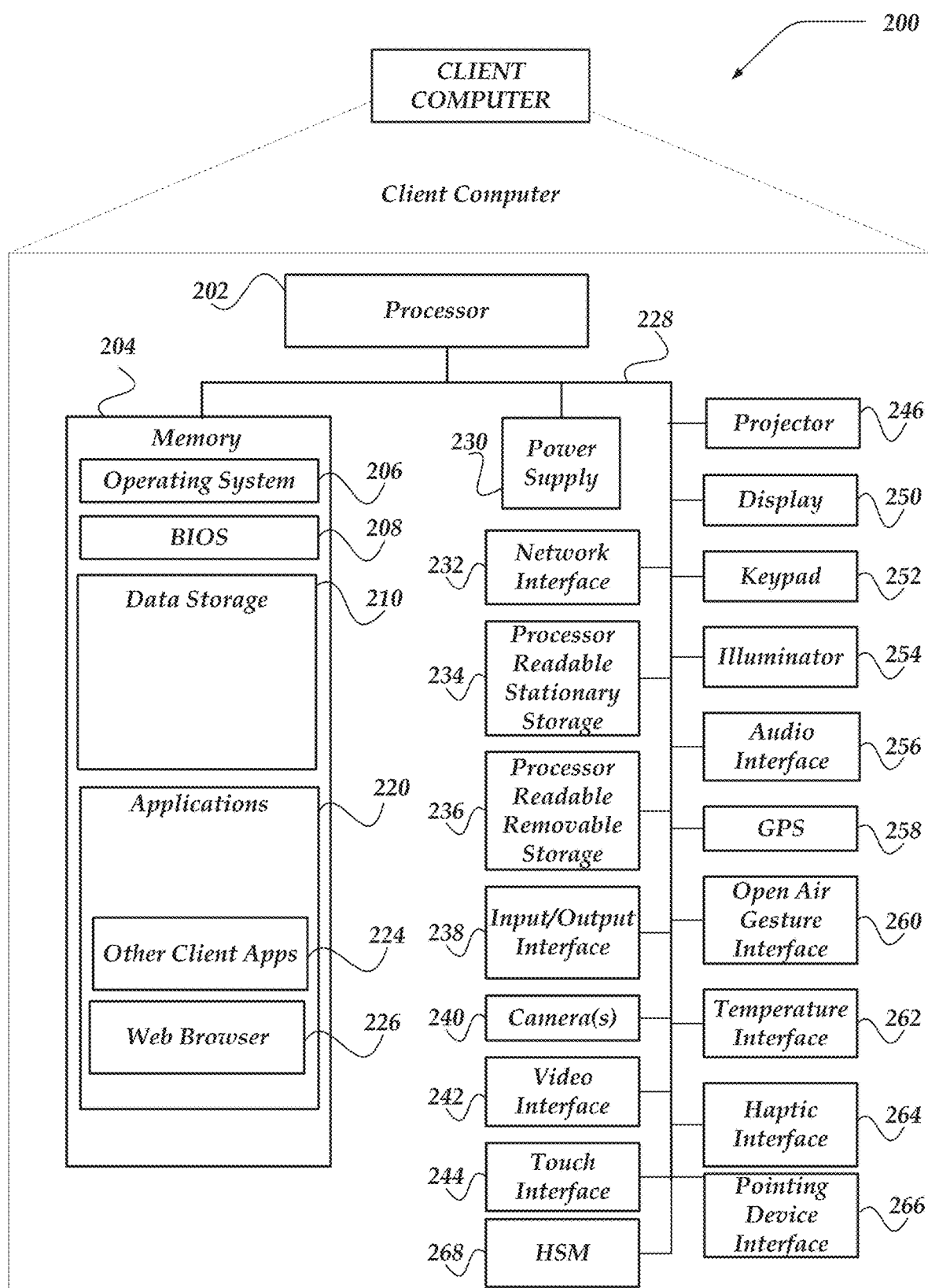
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
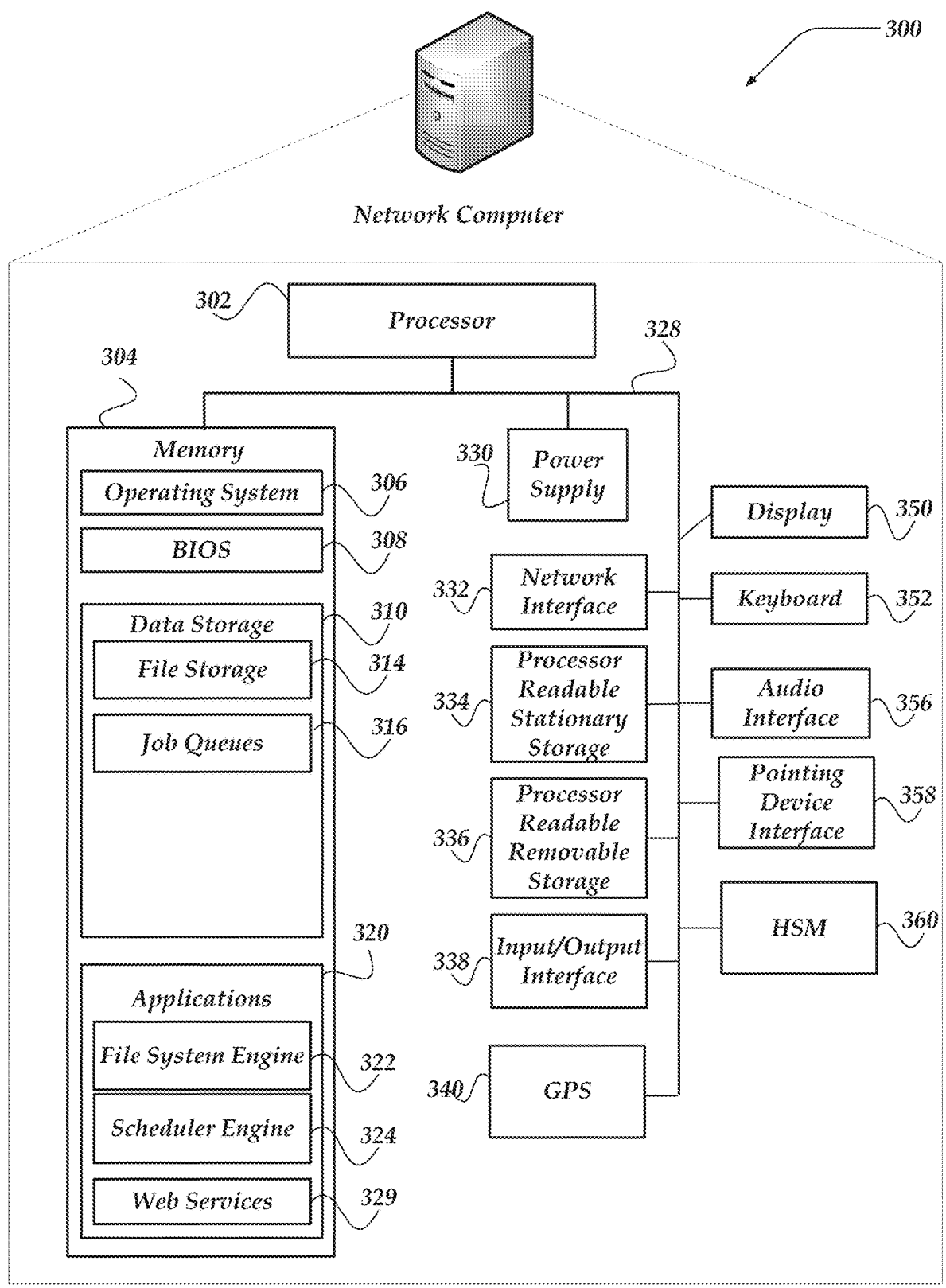
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, scheduling engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, write-ahead logs 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, scheduling engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, scheduling engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, scheduling engine 324, web services 329, or the like, may be provisioned and de-commissioned automatically.

Also, in one or more of the various embodiments, file system engine 322, scheduling engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
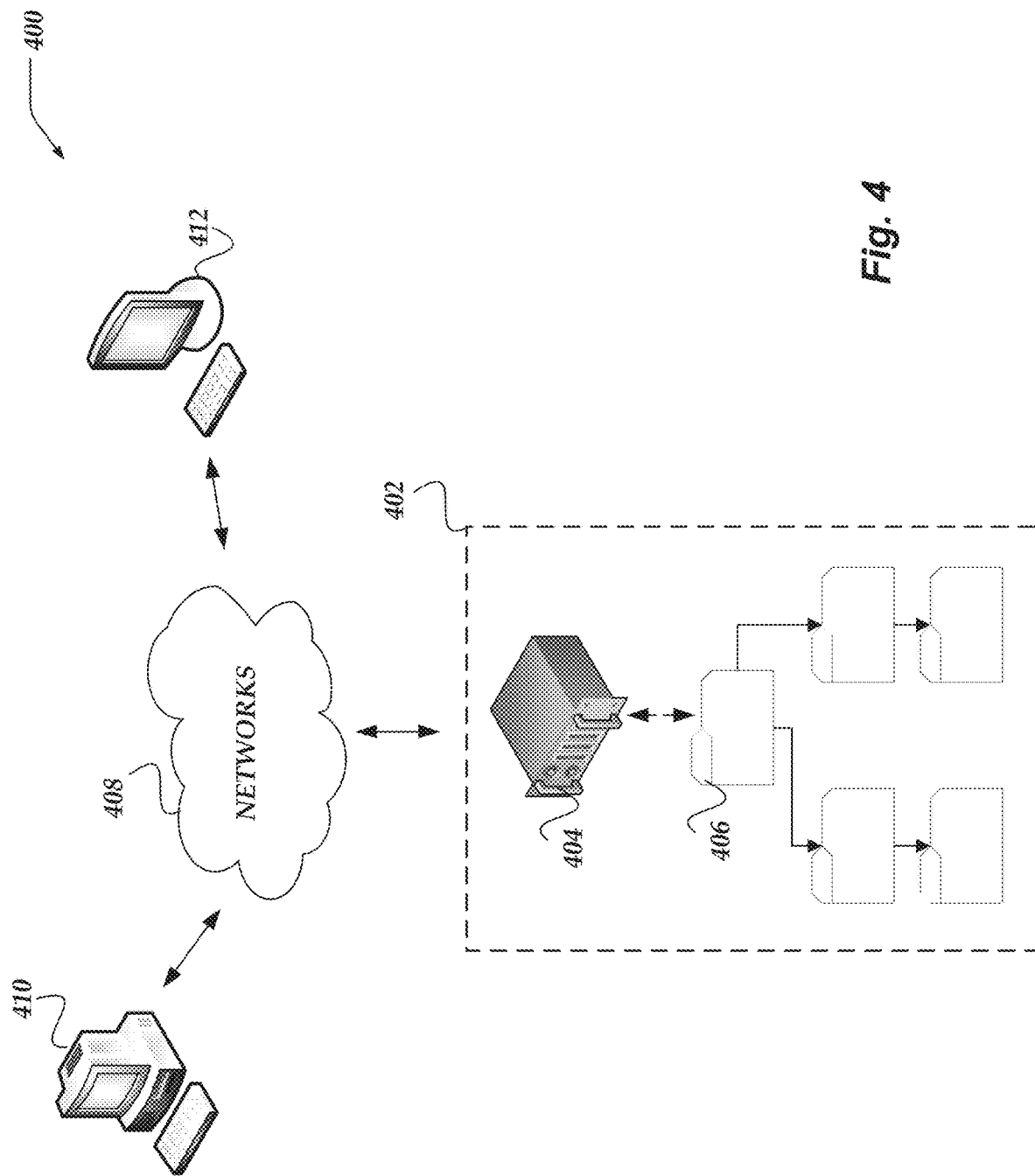
FIG. 4 illustrates a logical architecture of a system for bandwidth management in distributed file systems in accordance with one or more of the various embodiments.

FIG. 4 illustrates a logical architecture of system 400 for bandwidth management in distributed file systems in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system objects, documents, or the like) that may be stored in file system 402.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or the like, that may be stored in file system 402. In some embodiments, file system objects may include, files, documents, directories, folders, backups, snapshots, replication snapshots, replication information, or the like. In some embodiments, some file system objects may be comprised of smaller file system objects. Accordingly, in some embodiments, blocks or data blocks may be considered to be smallest file system objects that comprise other more complex file system objects, such as, files, documents, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines or replication engines may be arranged to mimic the interface or behavior of one or more conventional file systems.

Also, while file system 402 is illustrated as using one file system management computer with one set of file system objects, these innovations are not so limited. Innovations herein contemplate file systems that may include one or more file system management computers or one or more file system object data stores. In some embodiments, file system objects may be located remotely from one or more file system management computers. Also, a logical file system object store or file system may be spread across two or more cloud computing environments, storage clusters, or the like.

Figure 5:
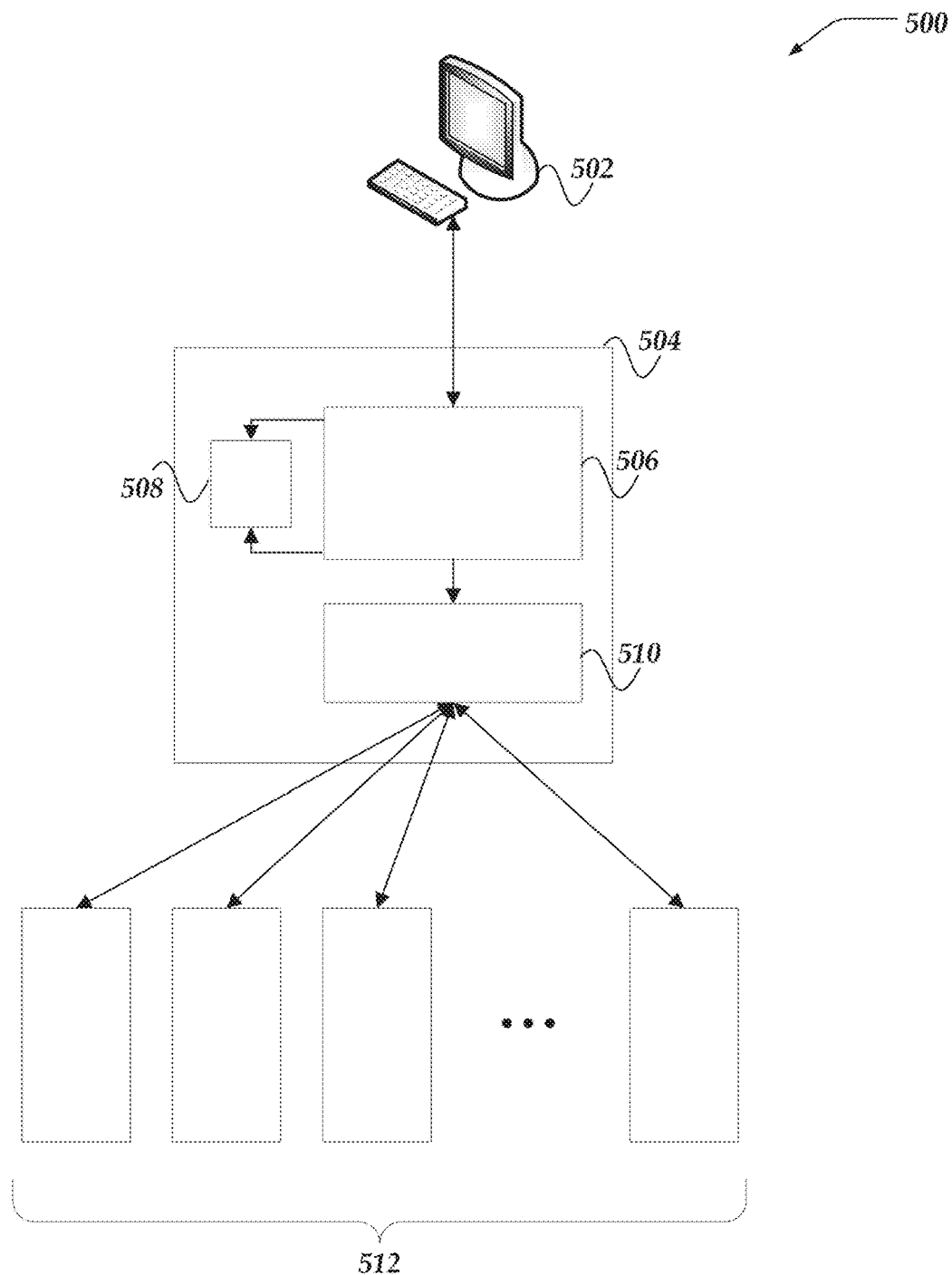
FIG. 5 illustrates a logical schematic of a system for bandwidth management in distributed file systems in accordance with one or more of the various embodiments.

FIG. 5 illustrates a logical schematic of system 500 for bandwidth management in distributed file systems in accordance with one or more of the various embodiments. In this example, system 500 may be considered to represent a portion of a distributed file system. Accordingly, in some embodiments, system 500 may include file system user/client 502, file system node 504, scheduler engine 506, job queue(s) 508, file system engine 510, or the like, as well as, one or more other file system nodes, represented here by file system nodes 512. As described aboe, file system node 504 and file system nodes 512 may be considered to be a cluster of file system nodes comprised of network computers, storage devices, or the like, that may be connected by one or more networks.

In some embodiments, clients, such as, client 502 may submit one or more file system requests to a file system. Accordingly, in some embodiments, the request may be routed to a particular file system node. In some embodiments, requests may be routed based on various policies associated with the file system or the networking environment. In some embodiments, each file system node may be enabled to receive or manage client requests. Thus, in some embodiments, each file system node may include a scheduling engine, file system engine, or the like, that may process client requests, including managing interacting with other file system nodes to service the request. For example, in some embodiments, an organization may interpose a load balancer, or the like, between the client and the file system such that the load balance distributes requests to file system nodes. Alternatively, in some embodiments, some file systems may provide a dedicated node that acts as a clearing house for processing requests from clients. Thus, in this example, for some embodiments, file system node 504 may be considered a file system node that receives requests from a client.

In one or more of the various embodiments, client requests may be intercepted by a scheduling engine, such as, scheduling engine 506. In some embodiments, scheduling engines may be arranged to classify incoming requests to direct them to a queue where they may wait until they may be dequeued and provided to a file system engine, such as, file system engine 510 for execution.

Accordingly, in one or more of the various embodiments, file system engines may be arranged to perform various operations to process the client request.

In one or more of the various embodiments, queues, such as, queues 508 may be arranged to include more than one separate queue grouped into particular categories, such as, data read queues, data write queues, meta-data read queues, meta-data write queues, or the like.

In one or more of the various embodiments, scheduling engines may be arranged to receive client requests that may be following one or more network file system protocols, such as, network file system (NFS) requests, server message block (SMB) requests, or the like. Accordingly, in some embodiments, scheduling engines may be arranged to classify incoming client requests into data reads, data writes, meta-data reads, meta-data writes, or the like. Thus, in some embodiments, scheduling engines may be arranged to assign client requests to a queue associated with the client request's classification. Also, in some embodiments, scheduling engines may be arranged to employ rules or instructions for classifying client requests that may be provided via configuration information to account for local requirements or local circumstance. For example, in some embodiments, a scheduling engine may be enabled to support additional file system protocols by including additional rules or instructions in the configuration information.

Note, in some embodiments, if client requests are distributed across two or more file system nodes in a file system cluster, other file system nodes may receive requests from clients as well.

Accordingly, in one or more of the various embodiments, scheduling engines, such as, scheduling engine 506 may be arranged to perform one or more resource scheduling actions to fulfill the file system requests according to resource utilization policies for the file system. In some embodiments, scheduling engines may be arranged to determine a particular utilization policy based on configuration information to account for local circumstances or local requirements. Likewise, in some embodiments, scheduling engines may be arranged to determine one or more parameters or threshold values for a utilization policy based on configuration information to enable a policy to be adjusted for local requirements or local circumstances.

Figure 6:
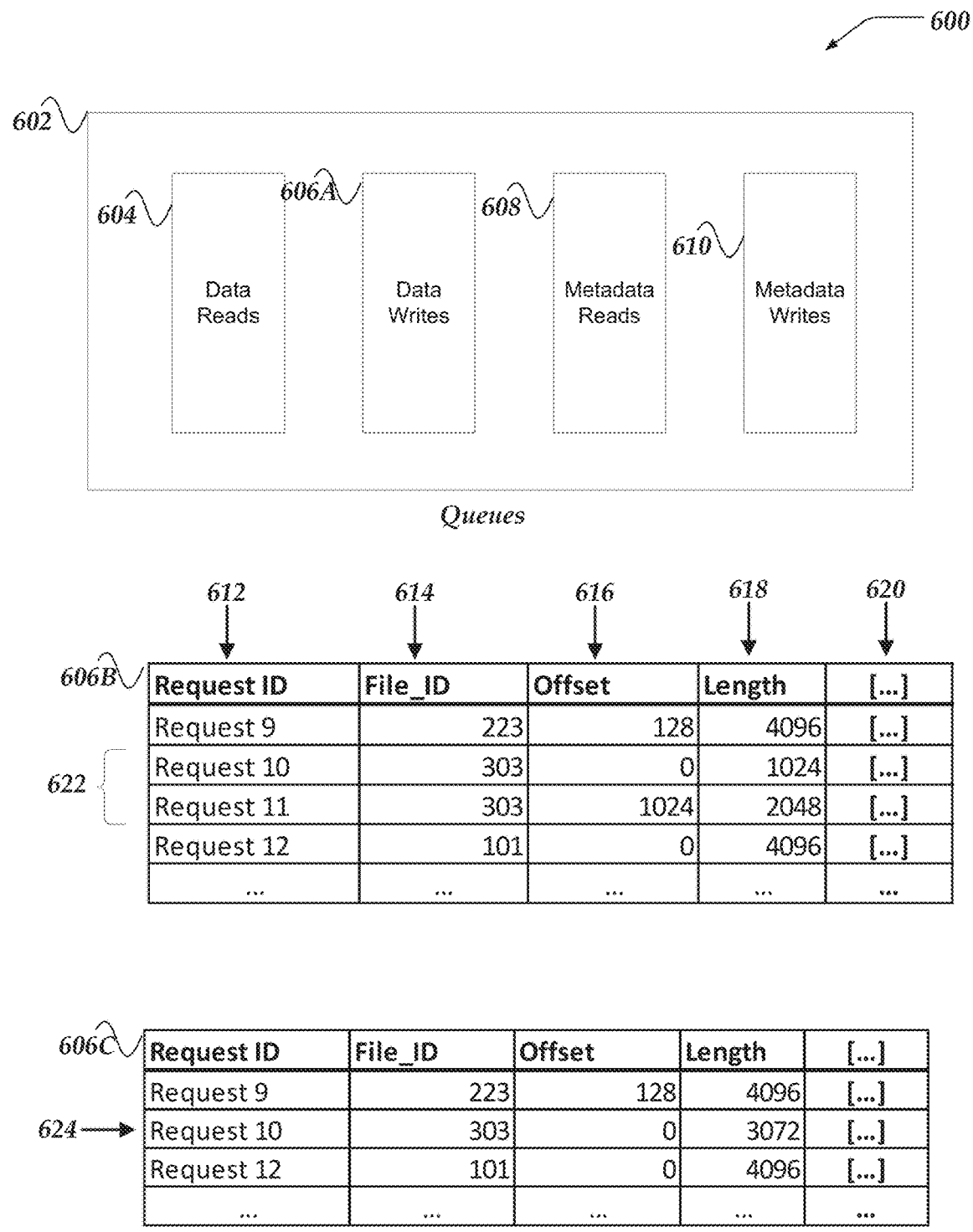
FIG. 6 illustrates a logical schematic of a system for bandwidth management in distributed file systems in accordance with one or more of the various embodiments.

FIG. 6 illustrates a logical schematic of system 600 for bandwidth management in distributed file systems in accordance with one or more of the various embodiments. As described above, in some embodiments, scheduling engines may be associated with one or more queues, such as, queues 602. In some embodiments, queues, such as queues 602 may comprise multiple queues, such as, data read queue 604, data write queue 606A, metadata write queue 608, metadata read queue 610, or the like, where each separate queue may be provided to queue particular types of requests. Accordingly, in some embodiments, scheduling engines may be arranged to distribute requests to a particular queue based on the type of request. Note, one of ordinary skill in the art will appreciate that more or fewer queues may be employed depending on local requirement or local circumstances without departing from the scope of these innovations. Likewise, in some embodiments, scheduling engines may be arranged to employ rules, instructions, or the like, provided via configuration information to classify requests or otherwise route requests to one or more particular queue. For example, in some embodiments, one or more special purpose queues may be employed for incoming requests based on one or more of request type, request source, request priority, or the like.

Also, in some embodiments, scheduling engines may be arranged to automatically consolidate one or more requests into a single request if particular conditions may be met. In some embodiments, if two or more requests may be directed to adjacent data in the file system, scheduling engines may be arranged to merge those requests into a single request. In some embodiments, scheduling engines may be configured to enforce a maximum data amount for a single request. Accordingly, in some embodiments, scheduling engines may be arranged to merge adjacent request up until a size limit.

In one or more of the various embodiments, request may be associated hint information that indicates various details of the request, such as, as file identifier, offset location (in the file), length of request, client identifier, or the like. In this example, for some embodiments, queue 606B may represent an expanded logical representation of queue 606A. Accordingly, in some embodiments, column 612 may store request identifiers, column 614 may store file identifiers, column 616 may store an offset value, column 618 may store the length or size of the request, or the like. Also, in some embodiments, a column, such as, column 620 may represent one or more additional columns that may be employed for storing one or more additional fields, such as, client identifiers, or the like. Note, in some embodiments, queues may be arranged to more or fewer columns without departing from the scope of these innovations. Further, in some embodiments, the unit associated with offset values, length values, or the like, may depend on configuration information of the file system. For example, in some embodiments, the offset/length value may represent an amount of data (e.g., 1024 bytes), a file system block, other chunk-size, or the like.

In this example, for some embodiments, queue 606B illustrate how four requests may be queued. In this example, for some embodiments, requests 622 may be considered to be adjacent requests because they are directed to adjacent data in the same file. Accordingly, in this example, scheduling engines may be arranged to coalesce requests 622. Thus, in this example, for some embodiments, queue 606C includes request 624 representing how adjacent requests 622 may be coalesced into a single request.

Also, in some embodiments, scheduling engines may be arranged to limit a length (e.g., size) of a request to a defined maximum value. Thus, in some embodiments, if the combined length of adjacent requests may be less than a defined maximum value, scheduling engines may be arranged to coalesce those adjacent requests.

Figure 7:
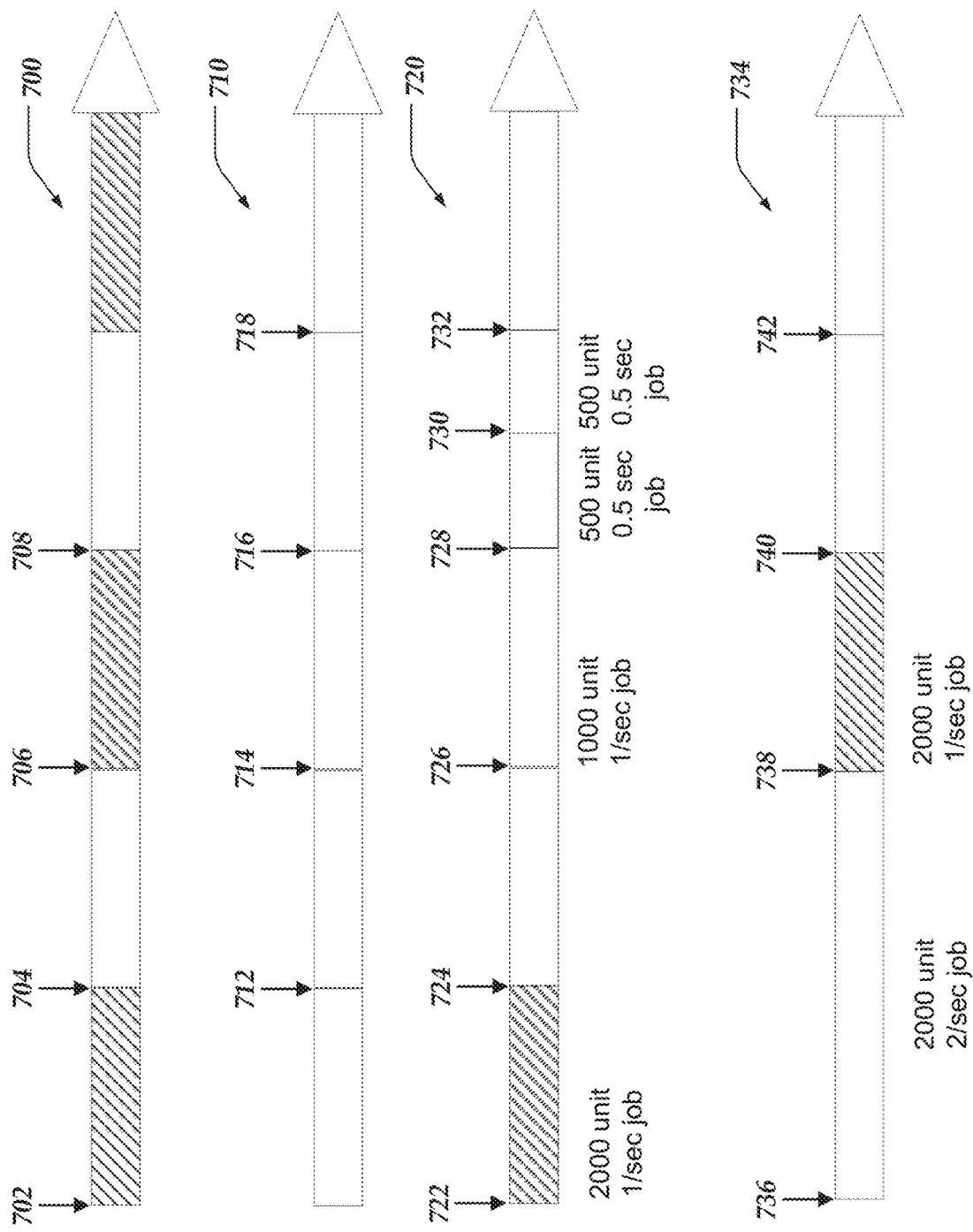
FIG. 7 illustrates a logical representation of timelines for bandwidth management in distributed file systems in accordance with one or more of the various embodiments.

FIG. 7 illustrates a logical representation of timelines for bandwidth management in distributed file systems in accordance with one or more of the various embodiments.

In one or more of the various embodiments, scheduling engines may be arranged to initiate jobs to perform requests as they are pulled from the queues. In some embodiments, scheduling engines may be arranged to determine the amount work in terms of work units that correspond to given job. Accordingly, in some embodiments, scheduling engines may be arranged to manage the amount of resources (e.g., bandwidth) consumed by a node by controlling the rate of work units that may be issued or performed by jobs for a given node.

Note, in some embodiments, as described above, requests may be distributed to different nodes that may be part of a file system node cluster. However, the execution of a job for the request may touch data stored on other nodes in the file system. Accordingly, in some embodiments, one or more nodes in the file system may each be managing work units for the requests that have been distributed to them. For example, in some embodiments, a write request may be randomly distributed to a node in the file system cluster. And, in this example, if job may be executed for the request, the file system engine may distribute write data across various nodes in the file system cluster as per the normal operation of a distributed file system.

Also, in some embodiments, a file system cluster may be configured to have one or more nodes designated to manage requests, jobs, work unit allocations, or the like.

In one or more of the various embodiments, scheduling engines may be arranged to enforce a work unit rate limit. For example, a file system may be configured to have a work unit rate limit of 1000 units per second. Thus, in some embodiments, if a job requires more than 1000 units of work, scheduling engines may be arranged to delay the execution of the job such that it doesn't exceed the work unit rate limit. Briefly speaking, for this example, a one second job that requires 2000 work units may be delayed for one second before executing. Thus, in this example, the 2000 work unit job may be executed over a two second time period to conform with the 1000 work unit per second rate limit.

Thus, for example, if every job is a 2000 work unit job that completes in one second and the work unit rate limit is set to 1000 units per second, scheduling engines may be arranged to alternate between delaying one second and running a job for one second to conform with the rate limit. Also, for example, if the work unit rate limit is 2000 units/second, scheduling engines would run a 2000 unit job every second.

Note, in some embodiments, requests may be assumed to be indivisible. Accordingly, in some embodiments, the job size may not be split or divided to accommodate the work unit rate limit. In some embodiments, splitting a request into two or more jobs to remain within the work unit rate limit may be generally disadvantageous because many requests from file system may be inherently indivisible. Also, in some cases, if a job is split into job-part-1 and job-part-2 executing them separately may introduce various correctness concerns, such as, out of order operations where job-part-2 completes before the job-part-1 completes. Thus, in such cases, the file system engines would have to employ complex mechanisms to ensure clients are provided the results in the correct order. Also, in some cases, splitting requests may result in a request being partially completed if a portion of a split job fails while other portions succeed. Accordingly, in some embodiments, scheduling engines may be arranged to delay the execution of large sized jobs to ensure the work unit rate limit be enforced rather than splitting jobs.

However, in many cases, requests may require jobs that have a different work unit requirements. For example, some jobs may have consumed 1000 work units while other jobs may consume 3000 work units. Also, in some embodiments, different jobs may take more or less time to complete. Accordingly, in some embodiments, scheduling engines may be arranged to vary the delay between executing jobs to conform to the rate limit. For example, in some embodiments, scheduling engines may be arranged to track the actual time jobs may take to run rather than predicting or anticipating an actual time duration for a job to complete.

Accordingly, in some embodiments, scheduling engines may be arranged to compute a delay for each job based on tracking the time interval since previous jobs were dequeued and the amount work units required by previous jobs. Thus, in some embodiments, based on the result, scheduling engines may delay a job for determined time or immediately execute it.

In this example, timeline 700 represents how scheduling engines may execute jobs in accordance with one or more of the various embodiments. In this example, the shaded portions of timeline 700 represent time-periods where the scheduling engine delays execution of jobs while the non-shaded portions represent execution time for jobs that are executed.

For this example, it may be assumed that a work unit rate limit is 1000 work units/second and each job takes 2000 work units and one second to complete. At timepoint 702 the scheduling engine may delay the job because if it executed immediately it would consume 2000 work units in one second which would exceed the rate limit of 1000 work units/second. In this example, timepoint 704 is one second after timepoint 702, thus the scheduling engine may execute the 2000 work unit one second job that will complete at timepoint 706. This results in an overall work unit consumption rate of 1000 work units per second. Similarly, in this example, if a next job one-second job would consume 2000 work units, scheduling engines may delay the next job for one second before executing it at timepoint 708. Thus, in some embodiments, the work unit rate limit may be enforced by delaying the execution of the jobs if the execution would exceed the work unit rate limit.

Also, for this example, as illustrated by timeline 710, if each job required 1000 work units and took one second to complete at steady state (after initial startup), the scheduling engine may simply execute each job in turn without delay and remain within the 1000 work unit/second rate limit. Here in timeline 710, timepoint 712, timepoint 714, timepoint 716, and timepoint 718 indicate one second intervals.

Also, for example, as illustrated by timeline 720, if each job requires different work units or work time, scheduling engines may be arranged to introduce delays into the work flow based on the work units or run time for each job depending on the request. In this example, scheduling engines may be arranged to delay a 2000 work unit one-second job starting at timepoint 722 for one second before beginning to execute it a timepoint 726. However, in this example, if the next request in the queue requires a 1000 work unit one-second job, the scheduling engine may execute it immediately at timepoint 726. Similarly, in this example, 500 work unit half-second jobs may be executed at timepoint 728 and timepoint 730 where the interval between timepoint 728 and timepoint 732 may be considered to be one second.

Further, for example, timeline 734 shows how a 2000 work unit two-second job may be executed without delay starting at timepoint 736 to timepoint 738 (2 seconds) and a next job that takes 2000 work units in one-second may be delayed to conform to a 1000 work unit/second rate limit where the interval between timepoint 738 and timepoint 740 represent a one second delay and the interval between timepoint 740 and timepoint 742 represent one second of work.

Also, in some embodiments, scheduling engines may be configured to enforce a maximum work unit per time unit.

Accordingly, in some embodiments, scheduling engines may be arranged to manage work units consumption by tracking time progression (e.g., difference since that last time work units were allocated to a job. In some embodiments, scheduling engines may be arranged to compute a work unit credit value that reflects how many work units may be available if the job were to be executed. Thus, in the case, of 1000 work unit one second jobs (in the 1000 work unit rate limit example), each job will consume no more than 1000 work units in a second. So no excess work units will be available. This conforms to the work unit rate limit because each job needs 1000 work units.

In the case of a 2000 work unit job, if 2000 work units were consumed to complete the job in one second, there would be a 1000 work unit deficit, because the 2000 work unit job would require 2000 work units in one second, 1000 more than allowed. Likewise, in some embodiments, if a job was a 3000 work unit in one-second job, the deficit would be 2000 units. Thus, in some embodiments, scheduling engines may be arranged to introduce time delays that match the time required for the deficit to be eliminated before launching the job. For example, if job A is a 3000 work unit one-second job it would produce a 2000 work unit deficit. In this example, the scheduling engine would delay job A for two seconds to account for the deficit.

Also, in some embodiments, scheduling engines may be arranged to employ multiple processes or multiple threads to service the queues.

In some embodiments, in the multi-threaded case, jobs may be dequeued before other jobs have completed. However, the process for managing work units may be similar to the single-threaded example above. In some embodiments, in the multi-threaded case, the scheduling engines may still be required to enforce a work unit rate limit. Accordingly, in some embodiments, the time intervals between the dequeuing of two jobs may be employed to determine the available work units or work unit deficit. If there may be a work unit deficit for a given job, scheduling engines may be arranged to delay the execution of the job to resolve the work unit deficit.

Accordingly, in some embodiments, scheduling engines may be arranged to track the time interval between when jobs are dequeued as well as the work unit availability or deficit (e.g., work unit credit) at the time they may be dequeued. Thus, in some cases, a job for a dequeued request may be delayed to based on its own work unit requirement as well as the work unit requirements of a pending job.

Note, FIG. 10 described below offers a more detailed disclosure of the actions taken by scheduling engines to allocate work units for scheduling jobs.

Generalized Operations

Figure 8:
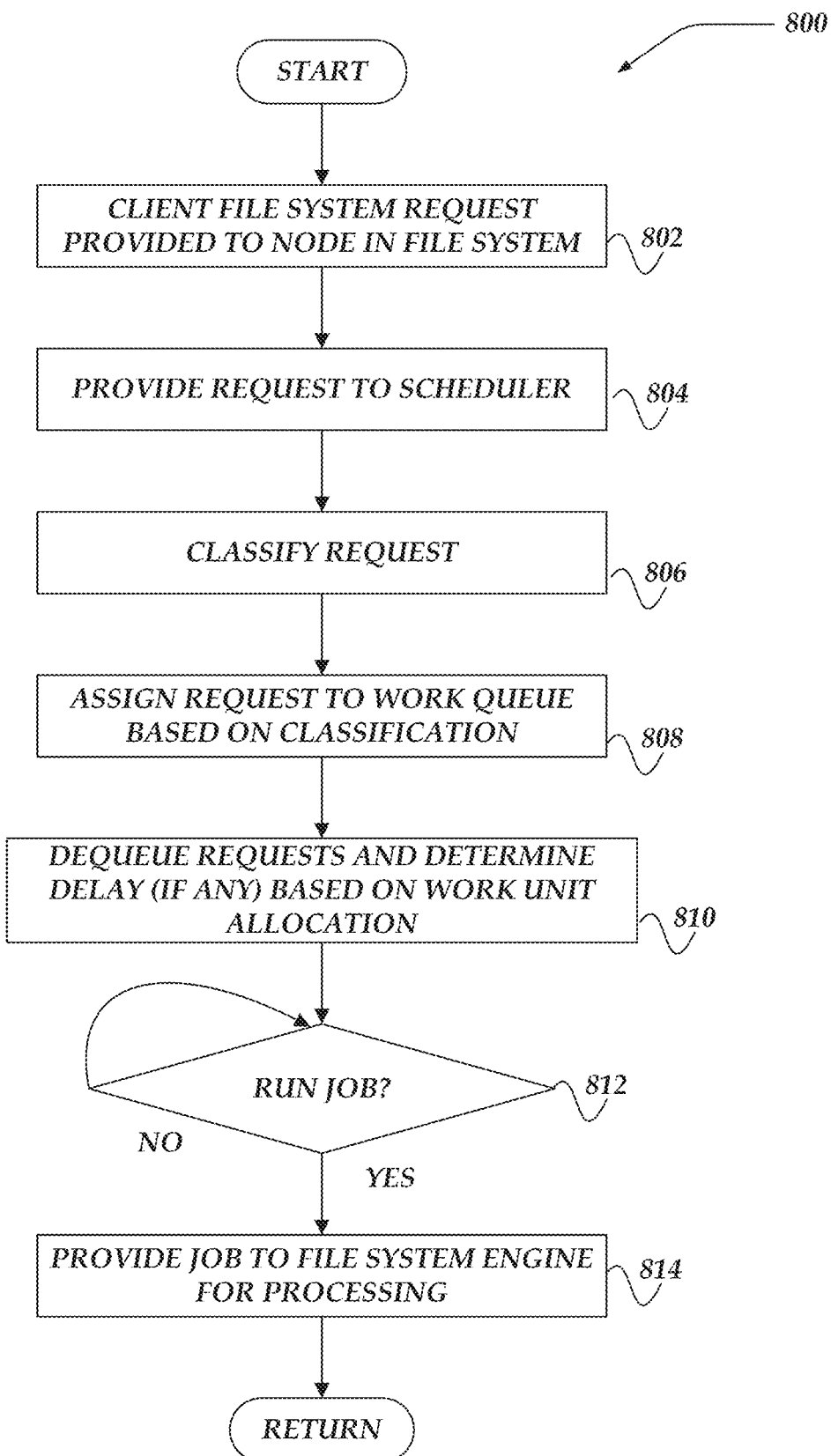
FIG. 8 illustrates an overview flowchart for a process for bandwidth management in distributed file systems in accordance with one or more of the various embodiments.
Figure 9:
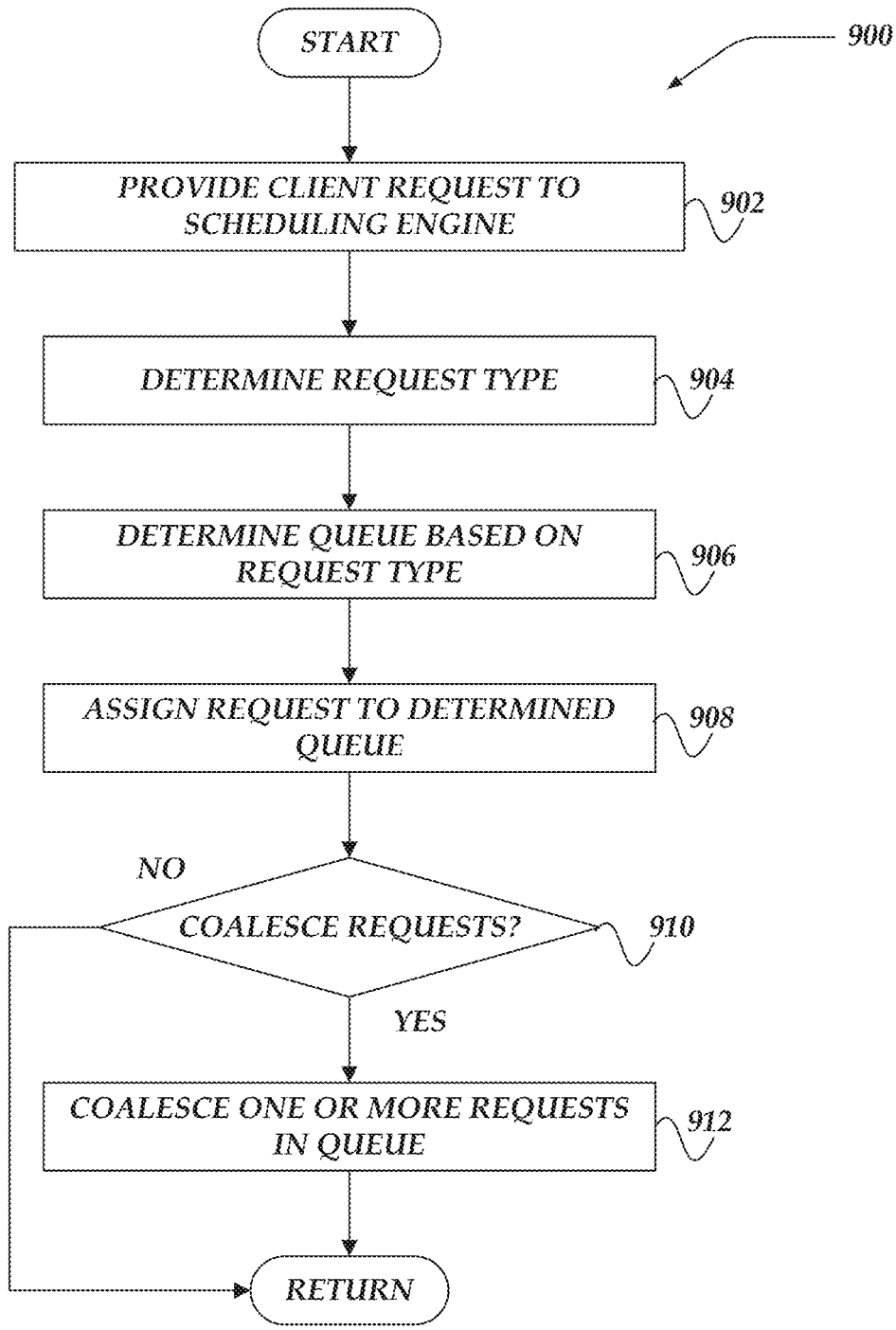
FIG. 9 illustrates a flowchart for a process for bandwidth management in distributed file systems in accordance with one or more of the various embodiments.
Figure 10:
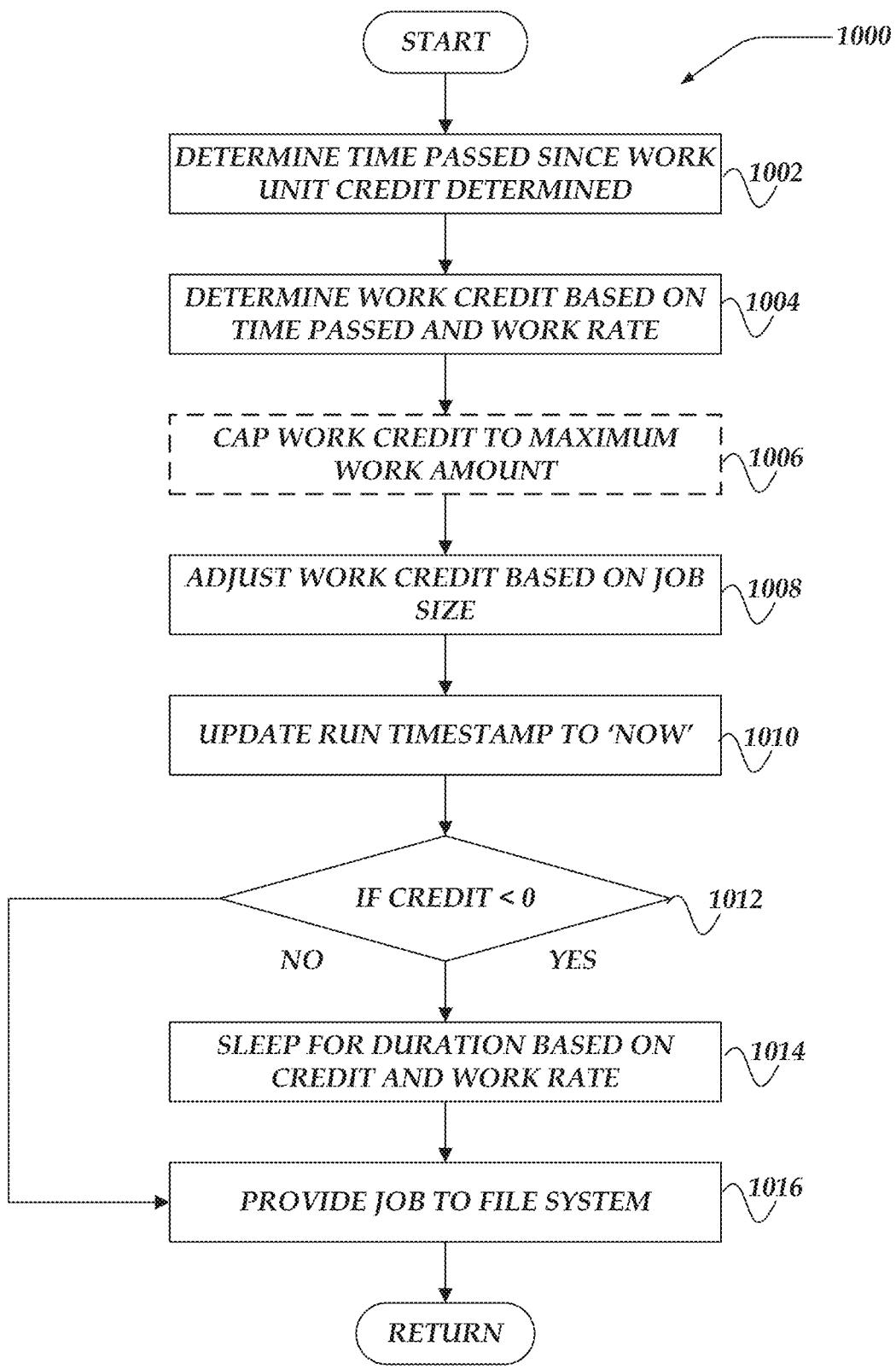
FIG. 10 illustrates a flowchart for a process for bandwidth management in distributed file systems in accordance with one or more of the various embodiments.

FIGS. 8-10 represent generalized operations for bandwidth management in distributed file systems in accordance with one or more of the various embodiments. In one or more of the various embodiments, processes 800, 900, and 1000 described in conjunction with FIGS. 8-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-10 may perform actions for bandwidth management in distributed file systems in accordance with at least one of the various embodiments or architectures such as those described in conjunction with FIGS. 4-7. Further, in one or more of the various embodiments, some or all of the actions performed by processes 800, 900, and 1000 may be executed in part by file system engine 322, scheduling engine 324, or the like.

FIG. 8 illustrates an overview flowchart for process 800 for bandwidth management in distributed file systems in accordance with one or more of the various embodiments. After a start block, at flowchart block 802, in one or more of the various embodiments, a request from a client may be provided to a node in file system. As described above, one or more clients may provide various file system requests to a file system. In some embodiments, client requests may be routed to file system cluster node to be serviced. In some cases, a load balancer or other traffic management/shaping service may select a node based on its configured policy, such as, load based, round-robin, or the like. In some embodiments, a file system may provide one or more designated nodes (e.g., controller nodes) where some or all requests may be routed.

At flowchart block 804, in one or more of the various embodiments, file system engines may be arranged to provide the request to a scheduling engine. In one or more of the various embodiments, file system engines may be arranged to provide incoming requests to a scheduling engine rather than immediately launching jobs to service the incoming requests. Note, in some cases, for some embodiments, file system engines may be arranged to configured to bypass scheduling engines for particular request types, clients, or the like. Also, in some embodiments, file system engines may be arranged to bypass scheduling engines for one or more requests that may be associated with internal operations of a file system.

At flowchart block 806, in one or more of the various embodiments, scheduling engines may be arranged to classify the request. In one or more of the various embodiments, scheduling engines may be arranged to determine the request type. Accordingly, in some embodiments, scheduling engines may be arranged to evaluate one or more data fields included with or associated with incoming requests to determine the type of request. For example, in some embodiments, one or more header fields in a file system request may include an indicator of the type of request. Also, in some embodiments, in some cases, requests may include a label or description the may indicate the request type.

At flowchart block 808, in one or more of the various embodiments, scheduling engines may be arranged to assign the request a queue based on its classification. As described above, in some embodiments, scheduling engines may be arranged to provide one or more queues that may be designated for particular request types.

At flowchart block 810, in one or more of the various embodiments, scheduling engines may be arranged to dequeue requests and determine delay (if any) based on work unit allocation rules and work unit rate limits. In one or more of the various embodiments, scheduling engines may be arranged to provide one or more processes, or the like, that may be arranged to service the one or more queues. In some embodiments, scheduling engines may provide multiple processes or threads that may asynchronously service the one or more queues. Accordingly, in some embodiments, as one job is finished, a process may return the queues to obtain the next available request.

At flowchart decision block 812, in one or more of the various embodiments, if a job may be executed, control may flow to block 814; otherwise, control may loop back to flowchart decision block 812. In one or more of the various embodiments, scheduling engines may be arranged to enforce one or more performance policies to manage how resources may be used in the file system. In some embodiments, a file system policy may require the network resource or compute resource may be limited for various reasons. For example, in some embodiments, a file system policy may require a portion of the available system bandwidth be reserved for administrative/recovery operations. Accordingly, in some embodiments, as described above, scheduling engines may arranged to enforce workload balance or limitations based on work units, work units rate limits, or the like.

Accordingly, in some embodiments, scheduling engines may be arranged to enforce workload policies by delaying the execution of a jobs according to a work unit consumption policy, or the like.

In one or more of the various embodiments, scheduling engines may be arranged to bypass work unit rate limit considerations for some request types. For example, in some embodiments, scheduling engines may be configured execute requests associated with meta-data immediately after they may be dequeued. Thus, in some embodiments, request related to naming/renaming file system objects, listing directory contents, or the like, may be execute without delay. Note, in some embodiments, scheduling engines may be arranged to employ rules, instructions, or the like, provided via configuration information to determine if work unit restrictions may be applied to a given request type to account for local circumstance or local requirements.

At flowchart block 814, in one or more of the various embodiments, scheduling engines may be arranged to provide the job to the file system engine to enable it to be executed in the file system. In one or more of the various embodiments, scheduling engines may be arranged to release request jobs to file system engines so the file system engines can service the request and provide the results if any to the client.

Next, in one or more of the various embodiments, control may be returned to a calling process.

FIG. 9 illustrates a flowchart for process 900 for bandwidth management in distributed file systems in accordance with one or more of the various embodiments. After a start block, at flowchart block 902, in one or more of the various embodiments, a client request may be provided to a scheduling engine. As described above, client requests directed to a file system may be provided and before they may be processed by the file system engine, the requests may be provided to scheduling engine on the node that may be directed to service the request.

At flowchart block 904, in one or more of the various embodiments, scheduling engines may be arranged to determine the type of request. In one or more of the various embodiments, client requests may be of various types, such as: data reads, for reading file data; data writes, for writing file data to the file system; meta-data reads, for reading one or more meta-data values associated with file system objects; meta-data writes, for writing one or more meta-data values associated with file system objects; or the like.

Accordingly, in some embodiments, scheduling engines may be arranged to evaluate one or more data fields included with or associated with incoming requests to determine the type of request. For example, in some embodiments, one or more header fields in a file system request may include an indicator of the type of request. Also, in some embodiments, in some cases, requests may include a label or description that may indicate the request type.

At flowchart block 906, in one or more of the various embodiments, scheduling engines may be arranged to determine a queue based on the request type. As described above, in some embodiments, scheduling engines may be arranged to provide different queues for different types of requests. In some embodiments, it may be advantageous to employ different queues for different types of requests to enable request coalescing. Also, in some embodiments, providing separate queues for different types of requests enables scheduling policies to be different for different types of requests.

In one or more of the various embodiments, scheduling engines may be configured to employ rules, instructions, or the like, provided via configuration information to determine one or more of the number queues or which queue(s) should be associated with which request types. For example, in some embodiments, scheduling engines may provide separate queues for different request types while in other cases scheduling engines may provide a single queue for multiple request types.

At flowchart block 908, in one or more of the various embodiments, scheduling engines may be arranged to assign the request to the determined queue.

At flowchart decision block 910, in one or more of the various embodiments, if conditions for coalescing request may be present, control may flow to block 912; otherwise, control may be returned to a calling process. In one or more of the various embodiments, if there may be adjacent requests of the same request type in the same queue, scheduling engines may be arranged to merge the adjacent requests into one request. Note, in some embodiments, an adjacent request may be defined as a request from the same client that is directed to the same file and where the requested data in that file that is adjacent to each other in the file. For example, if request A is a request from client K to read from file XYZ starting at offset position 0 through 1000, request B may be considered adjacent if is from client K to read from file XYZ starting at offset position 1001 through 1520. In some embodiments, scheduling engines may be arranged to merge requests that may be located in non-adjacent position in a queue. For example, if request A (from the above example) is located somewhere inside in the queue and request B is an incoming request, scheduling engines may be arranged to merge the two requests into one request even though they may not be at adjacent positions in the queue.

Further, in one or more of the various embodiments, scheduling engines may be configured to enforce a size limitation for a single request. Thus, in some embodiments, if the combined size of otherwise qualifying requests would exceed the request/job size limit, the merging of the requests may be omitted because a resultant merged request would have a job size that exceeds the limit.

At flowchart block 912, in one or more of the various embodiments, scheduling engines may be arranged to coalesce one or more requests in the queue.

Next, in one or more of the various embodiments, control may be returned to a calling process.

FIG. 10 illustrates a flowchart for process 1000 for bandwidth management in distributed file systems in accordance with one or more of the various embodiments. As described above, in some embodiments, scheduling engines may be arranged to determine work unit credit for request to determine if the execution of the request may conform to a work unit rate limit that may be in effect. Accordingly, in some embodiments, it may be assumed that a work unit rate limit may be configured for the file system. Also, in some embodiments, scheduling engines may be configured with a maximum work unit credit value to limit the potential for bursts of work that may disadvantageously impact file system performance.

For example, in some embodiments, a scheduling engine may be configured to have a work unit rate limit of 1000 work units per second and, optionally, a maximum work unit credit of 2000 work units.

For this example, the following values may be assumed unless otherwise stated: work unit rate limit of 1000 work units per second, request/job size 1000 work units, request/job duration one second, and maximum work units credit limit of 2000 work units. Accordingly, for brevity and clarity the above definition will not be repeated.

After a start flowchart block, at flowchart block 1002, in one or more of the various embodiments, scheduling engines may be arranged to determine the time interval since work unit credit was determined. As described above, in some embodiments, scheduling engines take a timestamp each time a request is dequeued. Accordingly, in some embodiments, scheduling engines may be arranged to compute how long since the last request was dequeued based on the timestamp take for the last dequeued request. In some embodiments, scheduling engines may be arranged to assume the time interval is zero for the initial starting condition.

At flowchart block 1004, in one or more of the various embodiments, scheduling engines may be arranged to determine work unit credit based on the time interval and work rate associated with the request. In one or more of the various embodiments, scheduling engines may be arranged to first compute the work unit credit based on the work unit credit carried over from the previous request/job, the work unit rate (how many work unit credits are allocated over the time interval).

For example, if the time interval is 2 seconds and the previous work unit credit is −1000 work units, a current work unit credit may be computed as credit=prior credit value−(time interval*work unit rate) which in this example would be 1000 work units=−1000 work units+(2 seconds*1000 work units/second). Thus, in some embodiments, there may be at this instant a credit of 1000 work units to apply to the dequeued request.

At flowchart block 1006, in one or more of the various embodiments, optionally, set work credit to maximum work credit if determined work credit exceeds a maximum work credit value. In some cases, a work unit credit may larger than a maximum value. Because, in some embodiments, as the interval since the previous request/job increases the computed work unit credit may increase as well. For example, if the time interval is six seconds rather than two seconds, the computed work unit credit would be 5000 work units. Accordingly, in some embodiments, scheduling engines may be configured to enforce a work unit credit limit to avoid high work unit credit allocations that could negatively impact file system performance. In some cases, the work unit credit limit may be referred to a burst limit. Thus, in some embodiments, if the work unit credit computed at block 1004 is 3000 work units, scheduling engines may set it the example maximum of 2000 work units.

Note, this block is indicated as being optional because this step may be omitted if the work unit credit remains under the maximum credit limit.

At flowchart block 1008, in one or more of the various embodiments, scheduling engines may be arranged to update the work credit based on the job size required to service the request. As described above, in some embodiments, each request may be associated with request size. In some embodiment, request size may correspond to the amount data read or written for the request. Also, in some embodiments, other characteristics of the request may affect job size depending on local policies, such as, request type, time-of-day, various utilization metrics, or the like. In general, job size may correspond to an amount work the job may be expected to require to complete. For example, in some embodiments, job size may be determined based on the size (in bytes) of a read or write request. In this example, the job size is 2000 work units. Accordingly, in this example, work unit credit is 1000 work units and job size is 2000 work units. Thus, in this example, the adjusted work unit is −1000 work units.

At flowchart block 1010, in one or more of the various embodiments, scheduling engines may be arranged to update a timestamp value to 'now' to indicate the time this credit determination occurred. As described, scheduling engines may be arranged to track the time interval between request dequeuing by taking and storing a timestamp value of the current dequeuing. Thus, in some embodiments, this timestamp value may be employed to determine the time interval used to allocate work units to the next dequeued request.

At flowchart decision block 1012, in one or more of the various embodiments, if there is a work unit credit deficit, control may flow to block 1014; otherwise, control may flow to block 1016. In this example, in some embodiments, the work unit credit was determined to be−1000 work units which indicates a work unit deficit for the job.

At flowchart block 1014, in one or more of the various embodiments, scheduling engines may be arranged to delay execution of the job based on the computed work unit credit deficit. In some embodiments, scheduling engines may be arranged to determine the duration of the delay based on the work unit credit and the work unit allocation rate limit. In this example, the work unit allocation is 1000 work units per second. Thus, in this example, scheduling engines may determine the delay to be one second since it will one second of delay to allocate enough work units to counter the work unit deficit.

At flowchart block 1016, in one or more of the various embodiments, scheduling engines may be arranged to provide the job to the file system for execution. In some embodiments, if the work unit deficit has been resolved by delay or there was no work unit deficit, scheduling engines may provide the job to the file system to be executed.

Next, in one or more of the various embodiments, control may be returned to a calling process.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to enable performance of actions, comprising:
    dequeuing a request stored in a queue based on availability of computational resources;
    determining a duration based on a first timestamp that corresponds to the dequeuing of the request and a second timestamp that corresponds to a prior dequeuing of a previous request;
    determining a work credit value based on the duration and a work rate associated with the file system, wherein the work credit value conforms to a maximum threshold value;
    initializing a job based on the dequeued request, wherein the work credit value is reduced based on a size of the job; and
    in response to the reduced work credit value being a negative value, performing further actions, including:
        determining a time delay based on the reduced work credit value, the work rate, and the size of the job; and
        delaying an execution of the job until the expiry of the time delay, wherein upon expiry of the time delay, the job is executed to satisfy the request.

2. The method of claim 1, further comprising:
    determining two or more adjacent requests in the queue, wherein each adjacent request corresponds to a same file system object and an adjacent data location in the file system object;

determining a portion of the two or more adjacent requests that have a combined data size that is less than a threshold value; and coalescing the portion of the two or more adjacent requests into a single request in the queue.

3. The method of claim 1, further comprising:

in response to the dequeued request being directed to reading or writing metadata corresponding to one or more file system objects, executing the job immediately.

4. The method of claim 1, further comprising:

updating the second timestamp to match the first timestamp.

5. The method of claim 1, further comprising:

storing the request in the queue based on a type associated with the request; and determining the queue from a plurality of queues, wherein each queue corresponds to a data write request type, a data read request type, a metadata write request type, or a metadata read request type.

6. The method of claim 1, further comprising:

dequeuing another request from the queue or another queue; and determining another work credit value based on another duration, another work rate associated with the file system, and the other work credit value.

7. The method of claim 1, further comprising:

determining the queue based on a type of the request; and storing the request in the determined queue.

8. A system for managing data in a file system comprising:

a network computer, comprising:

a memory that stores at least instructions; and one or more processors that execute instructions that perform actions, including:

dequeuing a request stored in a queue based on availability of computational resources;

determining a duration based on a first timestamp that corresponds to the dequeuing of the request and a second timestamp that corresponds to a prior dequeuing of a previous request;

determining a work credit value based on the duration and a work rate associated with the file system, wherein the work credit value conforms to a maximum threshold value;

initializing a job based on the dequeued request, wherein the work credit value is reduced based on a size of the job; and in response to the reduced work credit value being a negative value, performing further actions, including:

determining a time delay based on the reduced work credit value, the work rate, and the size of the job; and delaying an execution of the job until the expiry of the time delay, wherein upon expiry of the time delay, the job is executed to satisfy the request; and one or more client computers, comprising:

a memory that stores at least instructions; and one or more processors that execute instructions that perform actions, including, providing the request to the file system.

9. The system of claim 8, wherein the one or more network computer processors execute instructions that perform actions, further comprising:

determining two or more adjacent requests in the queue, wherein each adjacent request corresponds to a same file system object and an adjacent data location in the file system object;

determining a portion of the two or more adjacent requests that have a combined data size that is less than a threshold value; and coalescing the portion of the two or more adjacent requests into a single request in the queue.

10. The system of claim 8, wherein the one or more network computer processors execute instructions that perform actions, further comprising:

in response to the dequeued request being directed to reading or writing metadata corresponding to one or more file system objects, executing the job immediately.

11. The system of claim 8, wherein the one or more network computer processors execute instructions that perform actions, further comprising:

updating the second timestamp to match the first timestamp.

12. The system of claim 8, wherein the one or more network computer processors execute instructions that perform actions, further comprising:

storing the request in the queue based on a type associated with the request; and determining the queue from a plurality of queues, wherein each queue corresponds to a data write request type, a data read request type, a metadata write request type, or a metadata read request type.

13. The system of claim 8, wherein the one or more network computer processors execute instructions that perform actions, further comprising:

dequeuing another request from the queue or another queue; and determining another work credit value based on another duration, another work rate associated with the file system, and the other work credit value.

14. The system of claim 8, wherein the one or more network computer processors execute instructions that perform actions, further comprising:

determining the queue based on a type of the request; and storing the request in the determined queue.

15. A processor readable non-transitory storage media that includes instructions for managing data in a file system over a network, wherein execution of the instructions by one or more processors on one or more network computers performs actions, comprising:

dequeuing a request stored in a queue based on availability of computational resources;

determining a duration based on a first timestamp that corresponds to the dequeuing of the request and a second timestamp that corresponds to a prior dequeuing of a previous request;

determining a work credit value based on the duration and a work rate associated with the file system, wherein the work credit value conforms to a maximum threshold value;

initializing a job based on the dequeued request, wherein the work credit value is reduced based on a size of the job; and in response to the reduced work credit value being a negative value, performing further actions, including:

determining a time delay based on the reduced work credit value, the work rate, and the size of the job; and delaying an execution of the job until the expiry of the time delay, wherein upon expiry of the time delay, the job is executed to satisfy the request.

16. The media of claim 15, further comprising:
determining two or more adjacent requests in the queue, wherein each adjacent request corresponds to a same file system object and an adjacent data location in the file system object;
determining a portion of the two or more adjacent requests that have a combined data size that is less than a threshold value; and
coalescing the portion of the two or more adjacent requests into a single request in the queue.

17. The media of claim 15, further comprising:
in response to the dequeued request being directed to reading or writing metadata corresponding to one or more file system objects, executing the job immediately.

18. The media of claim 15, further comprising:
updating the second timestamp to match the first timestamp.

19. The media of claim 15, further comprising:
storing the request in the queue based on a type associated with the request; and
determining the queue from a plurality of queues, wherein each queue corresponds to a data write request type, a data read request type, a metadata write request type, or a metadata read request type.

20. The media of claim 15, further comprising:
dequeuing another request from the queue or another queue; and
determining another work credit value based on another duration, another work rate associated with the file system, and the other work credit value.

21. The media of claim 15, further comprising:
determining the queue based on a type of the request; and
storing the request in the determined queue.

22. A network computer for managing data in a file system, comprising:
a memory that stores at least instructions; and
one or more processors that execute instructions that perform actions, including:
dequeuing a request stored in a queue based on availability of computational resources;
determining a duration based on a first timestamp that corresponds to the dequeuing of the request and a second timestamp that corresponds to a prior dequeuing of a previous request;
determining a work credit value based on the duration and a work rate associated with the file system, wherein the work credit value conforms to a maximum threshold value;
initializing a job based on the dequeued request, wherein the work credit value is reduced based on a size of the job; and
in response to the reduced work credit value being a negative value, performing further actions, including:
determining a time delay based on the reduced work credit value, the work rate, and the size of the job; and
delaying an execution of the job until the expiry of the time delay, wherein upon expiry of the time delay, the job is executed to satisfy the request.

23. The network computer of claim 22, wherein the one or more processors execute instructions that perform actions, further comprising:
determining two or more adjacent requests in the queue, wherein each adjacent request corresponds to a same file system object and an adjacent data location in the file system object;
determining a portion of the two or more adjacent requests that have a combined data size that is less than a threshold value; and
coalescing the portion of the two or more adjacent requests into a single request in the queue.

24. The network computer of claim 22, wherein the one or more processors execute instructions that perform actions, further comprising:
in response to the dequeued request being directed to reading or writing metadata corresponding to one or more file system objects, executing the job immediately.

25. The network computer of claim 22, wherein the one or more processors execute instructions that perform actions, further comprising:
updating the second timestamp to match the first timestamp.

26. The network computer of claim 22, wherein the one or more processors execute instructions that perform actions, further comprising:
storing the request in the queue based on a type associated with the request; and
determining the queue from a plurality of queues, wherein each queue corresponds to a data write request type, a data read request type, a metadata write request type, or a metadata read request type.

27. The network computer of claim 22, wherein the one or more processors execute instructions that perform actions, further comprising:
dequeuing another request from the queue or another queue; and
determining another work credit value based on another duration, another work rate associated with the file system, and the other work credit value.

28. The network computer of claim 22, wherein the one or more processors execute instructions that perform actions, further comprising:
determining the queue based on a type of the request; and
storing the request in the determined queue.

* * * * *